Figure 1:
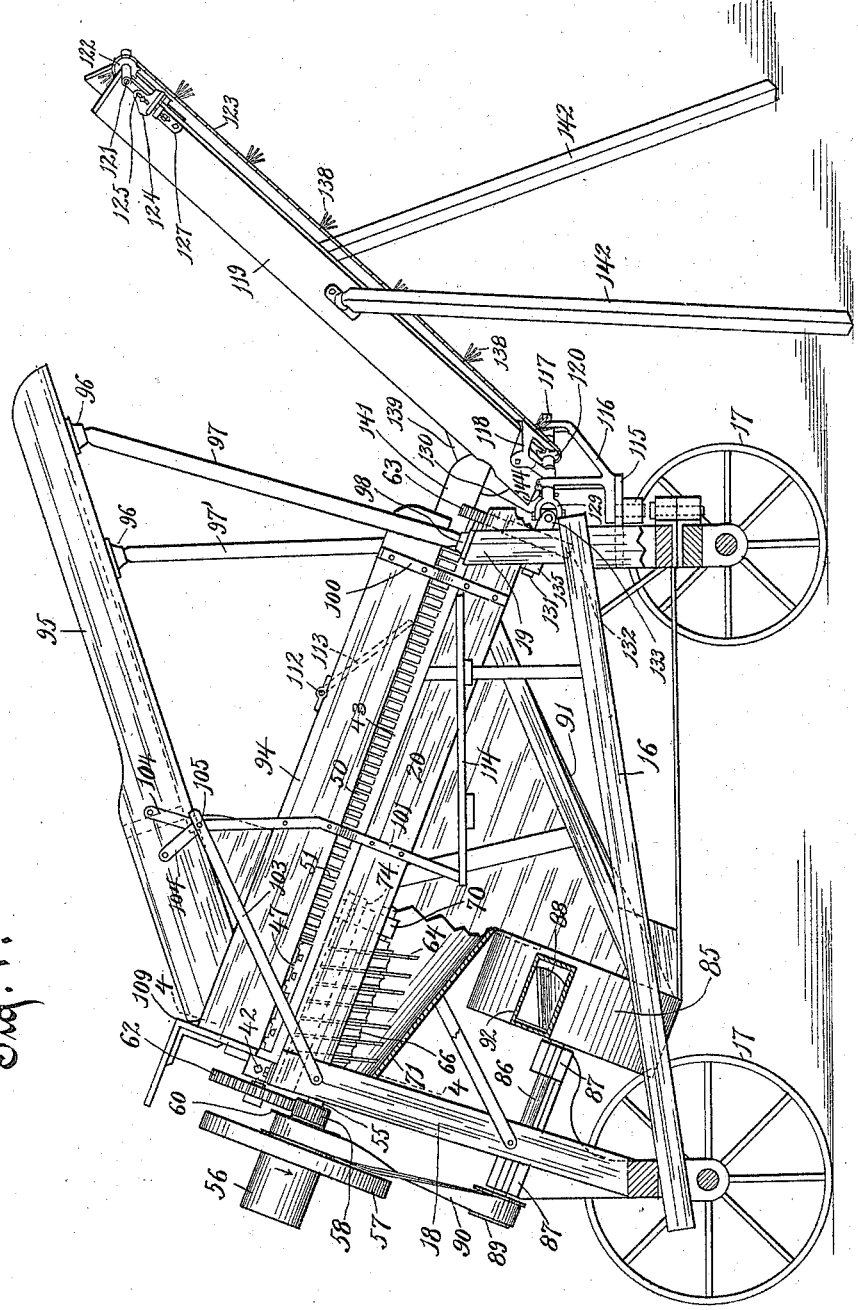

(No Model.) 4 Sheets—Sheet 1.

A. ROSENTHAL.
CORN HUSKER AND FODDER SHREDDER.

No. 575,376. Patented Jan. 19, 1897.

Witnesses.
C. H. Keeney
Anna C. Faust

Inventor.
August Rosenthal
By Benedict and Morsell
Attorneys.

(No Model.) 4 Sheets—Sheet 2.
A. ROSENTHAL.
CORN HUSKER AND FODDER SHREDDER.
No. 575,376. Patented Jan. 19, 1897.
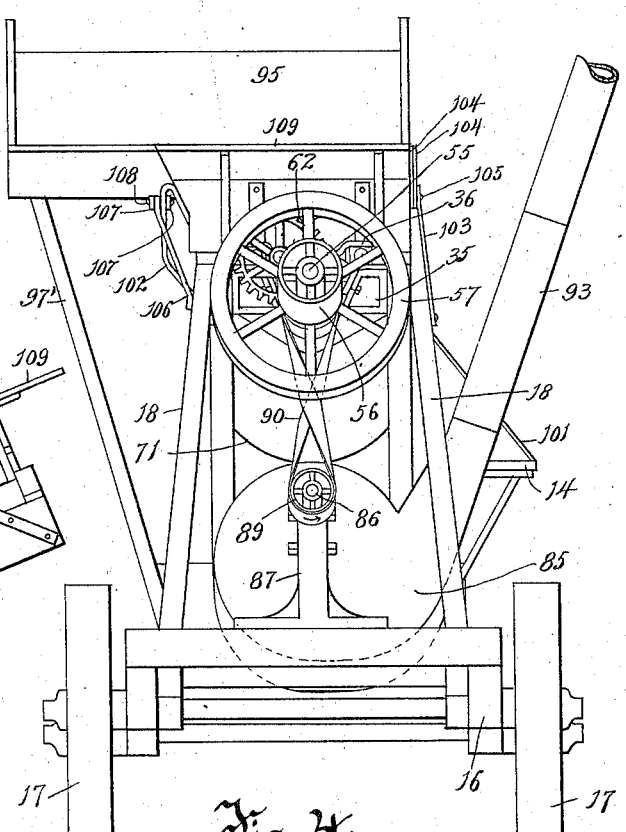
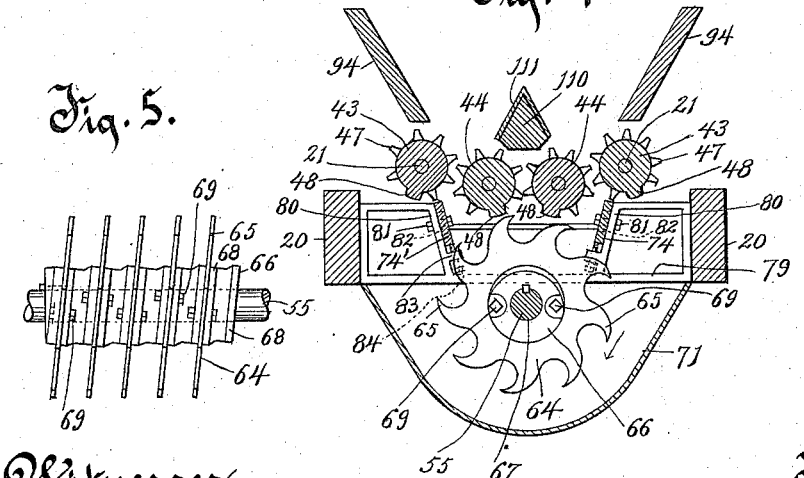
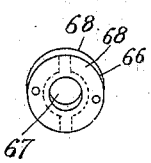
Witnesses.
O. H. Keeney
Anna V. Faust
Inventor.
August Rosenthal
By Benedict and Morsell
Attorneys.

(No Model.) 4 Sheets—Sheet 3.
A. ROSENTHAL.
CORN HUSKER AND FODDER SHREDDER.
No. 575,376. Patented Jan. 19, 1897.
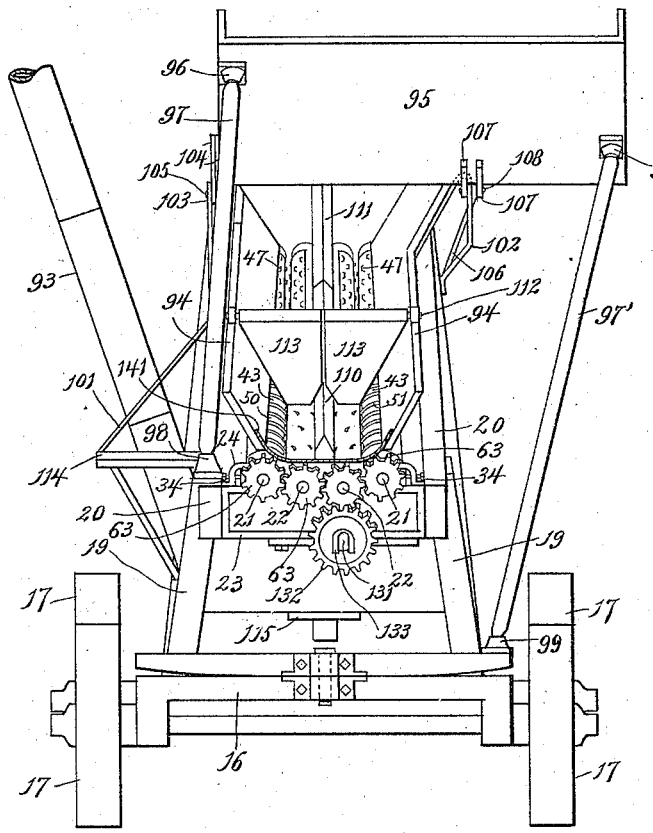
Fig. 3.
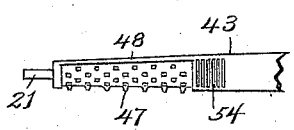
Fig. 17.
Fig. 7.
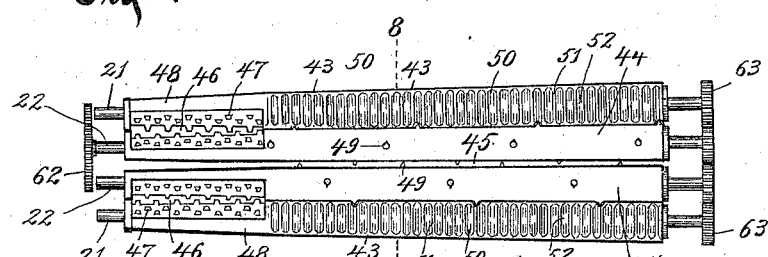
Fig. 9.
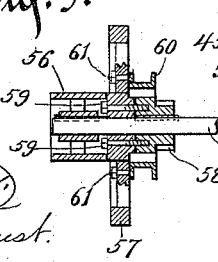
Fig. 8.
Witnesses
O. H. Keeney
Anna V. Faust
Inventor.
August Rosenthal
By Benedict and Morsell
Attorneys.
THE NORRIS PETERS CO., PHOTO-LITHO., WASHINGTON, D. C.

(No Model.) 4 Sheets—Sheet 4.
A. ROSENTHAL.
CORN HUSKER AND FODDER SHREDDER.
No. 575,376. Patented Jan. 19, 1897.
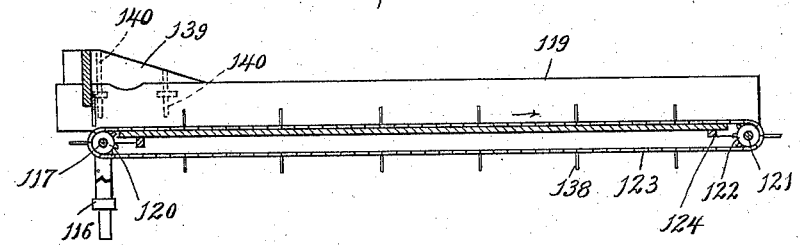
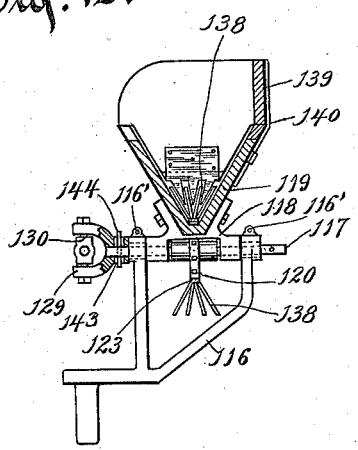
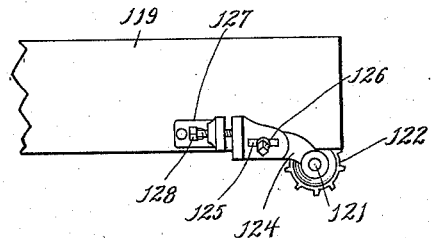
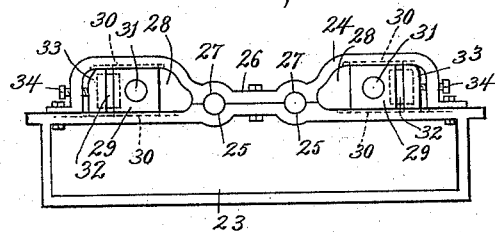
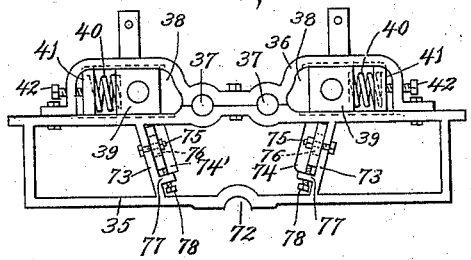
Witnesses.
O. N. Keeney.
Anna V. Faust.
Inventor.
August Rosenthal.
By Benedict and Morsell.
Attorneys.

UNITED STATES PATENT OFFICE.

AUGUST ROSENTHAL, OF MILWAUKEE, WISCONSIN.

CORN-HUSKER AND FODDER-SHREDDER.

SPECIFICATION forming part of Letters Patent No. 575,376, dated January 19, 1897.

Application filed May 11, 1896. Serial No. 591,189. (No model.)

*To all whom it may concern:*

Be it known that I, AUGUST ROSENTHAL, of Milwaukee, in the county of Milwaukee and State of Wisconsin, have invented a new and useful Improvement in Corn-Huskers and Fodder-Shredders, of which the following is a description, reference being had to the accompanying drawings, which are a part of this specification.

My invention has relation to improvements in combined corn-huskers and fodder-shredders.

The object of the invention is to provide in one machine improved and simple mechanism whereby the stalks are first shredded and then carried to a place of deposit and the ears subsequently husked, the husks being carried to the same place of deposit as the shredded stalks and the husked ears being conveyed to a separate place of deposit, the conveying mechanism for the ears being adjustable, whereby said conveyer may be made to readily adapt itself to any particular place of deposit.

The invention includes the above operations in a single, compact, automatic, and simple machine capable of being constructed at a minimum of cost.

With the above and other objects in view the invention consists of the devices and parts or their equivalents, as hereinafter more fully set forth.

In the accompanying drawings, Figure 1 is a side elevation of the complete machine with parts broken away. Fig. 2 is a rear end elevation. Fig. 3 is a front end elevation. Fig. 4 is a cross-section on the line 4 4 of Fig. 1. Fig. 5 is a fragment of one of the shredder-saws. Fig. 6 is a detail of one of the spacing-collars between the saws. Fig. 7 is a plan view of the several rolls. Fig. 8 is a cross-section on the line 8 8 of Fig. 7. Fig. 9 is a sectional view through the several wheels on the rear end of the shaft carrying the saws. Fig. 10 is a view of the boxes at the front of the machine. Fig. 11 is a view of the boxes at the rear of the machine. Fig. 12 is a longitudinal section of the conveyer. Fig. 13 is a cross-section of the conveyer. Fig. 14 is a detail view showing means for tightening the conveyer-chain. Fig. 15 is a detail view of the sliding journal-box. Fig. 16 is an elevation of a fragment of the upper portion of one side of the machine; and Fig. 17 is a view of a fragment of one of the rolls, showing a reverse side to the side shown in Fig. 7.

Referring to the drawings, the numeral 16 indicates the truck of the machine, mounted upon the wheels 17. Extending upwardly from the rear cross-piece of this truck are rearwardly-inclined uprights 18 18, while extending upwardly from the opposite end of the truck are the front shorter uprights 19 19. To the upper ends of the respective sets of uprights 18 and 19 are connected the ends of the longitudinal side pieces 20 20. These side pieces, therefore, are on a gradual inclination from the front to the rear of the machine. Arranged between and slightly above these side pieces and running in a plane parallel therewith are a series of shafts, the outer shafts being indicated by the numerals 21 21 and the inner shafts by the numerals 22 22. The forward ends of these shafts are journaled in suitable boxes. These boxes are formed of two sections—viz., a lower section 23 and an upper section 24. The lower section is arranged between the forward ends of the side pieces 20, and the upper edge thereof is provided with two semicircular recesses 25 25, arranged at an intermediate point thereof, in which the forward ends of the inner shafts fit. The upper section or cap of the box is provided with a straight central portion 26, which is parallel to and rests upon the central portion of the upper edge of the lower section. This straight central portion 26 is provided upon its under edge with semicircular recesses 27, which register with the semicircular recesses 25 and form a complete circular bearing for the ends of the shafts 22.

At opposite ends of the straight central portion 26 the upper section is formed with the elongated spaces 28 28, in which are fitted journal-boxes 29 29, said journal-boxes adapted to move in the guide-slots 30 30. These journal-boxes are provided with circular openings 31 31, in which the forward ends of the outer shafts 21 21 are adapted to be received.

The outer ends of the journal-boxes are provided with recesses, on which rubber cushions 32 32 are disposed. The outer ends of these rubber cushions are let into blocks 33 33, said blocks adapted to be adjusted by means of set-screws 34 34, passing through the outer ends of the upper section 24 and engaging against the sides of said blocks.

The journal-boxes for the rear ends of the several shafts are formed in identically the same manner as the front journal-boxes, consisting of a lower section 35, arranged between the rear ends of the side pieces 20, and an upper section 36, secured to the upper edge of the lower section. The two sections form the central bearings 37 37 for the rear ends of the inner shafts 22 and the outer spaces 38 38 for the accommodation of the journal-boxes 39 39, in which journal-boxes the rear ends of the outer shafts 21 fit. Instead of employing the rubber cushions 32, however, I prefer to use the coiled springs 40 40, which are interposed between the journal-boxes 39 and the blocks 41 41, said blocks being adjusted inwardly and outwardly by means of the set-screws 42 42. It will be seen that the bearings for the opposite ends of the inner shafts 22 are on a plane lower than the bearings for the opposite ends of the outer shafts 21. Inasmuch as the cornstalks are fed at an incline to the several rollers which are mounted upon the shafts, this arrangement permits the stalks when so fed to readily pass between the rollers. The outer rollers of the series are indicated by the numerals 43 43, and the inner rollers by the numerals 44 44. There is a slight space 45 between the rollers 44 throughout their entire length, while the outer rollers 43 contact with the inner rollers, excepting at the feed ends of the respective rollers. At these ends there are spaces 46, from the rear extremities inwardly for a desired distance, which spaces gradually diminish in width toward their forward or inner ends.

It will be seen that all the several rollers gradually taper from their front ends rearwardly, having their smallest diameters at said rear ends. These smaller rear ends are designed for separating the ears of corn from their stalks, while the remaining portions of the inner rollers serve to husk the ears, and the remaining portions of the outer rollers to split and sever points of nubbins. The smaller rear ends of all the several rollers are provided with longitudinal rows of radially-projecting teeth 47, which rows of teeth on each set of adjacent rollers alternate with each other longitudinally, the rows of teeth on one entering the intermediate spaces axially or longitudinally on the other roller as the rollers revolve. The teeth 47, as the corn is fed to the rollers, take hold of the stalks and carry them between the rollers. These teeth 47, it will be noticed, do not extend entirely around the circumference of the rollers, but a plain or smooth surface 48 is left on each. The ears of corn with their stalks are fed down to these small or feed ends of the rollers, and the stalks on being grasped by the teeth 47 are carried into the widest portions of the spaces 46, gradually working down to the more narrow portions of said spaces, where they are broken off. Now, as the rollers revolve the plain or smooth surfaces 48 thereof meet and have the effect of tearing the ears off from the stalks, the stalks which are in the more narrow portions of the spaces 46 being more readily torn off by reason of the combined action of the smooth surfaces 48 and the wedging action of the narrowed portions of the spaces.

The portions of the inner rollers 44 in advance of the feeding ends constitute the husking parts of said rollers, and are each provided with series of projecting husking-teeth 49. The space 45 between these rollers permits the respective teeth to clear the rollers as said rollers revolve.

The portions of the outer rollers in advance of their rear feed ends are each provided with a longitudinal line of transversely-elongated slots 50, forming projecting ribs 51 between each set of slots.

It will be noticed that the centers of the transversely-elongated slots are raised considerably above the remaining portions of the slots to form projections 52, which projections, being of rough casting, are best adapted to tear the points off the ears of corn after the ribs 51 have split said points. The rollers 43 are provided with small indentations or recesses 53, which are so positioned and arranged as to receive the pins 49 as the several rollers revolve. At points of the rollers 43 diametrically opposite the slots 50 are a series of fine creases 54, (see Fig. 17,) which extend forwardly for a limited distance from the feed ends of the rollers. These fine creases are for the purpose of taking hold of any short pieces of stalk which may remain on the ears and be between the rollers after said ears leave the feed or stalk-severing portions of said rollers.

The numeral 55 indicates a main driving-shaft mounted in bearings at the rear end of the machine. This shaft has keyed to its outer end a belt-pulley 56, and next to this pulley carries a fly-wheel 57. The inner portion of the hub of this fly-wheel bears against the inner face of the hub of a keyed gear-wheel 58, the fly-wheel being secured to said gear-wheel by means of bolts 59 passing through the hub of said fly-wheel and entering the hub of the gear-wheel. A spokeless belt-pulley 60 surrounds the hub of the gear-wheel 58, and is secured to the spokes of the fly-wheel by means of bolts 61. The particular connection described between the fly-wheel 57 and the gear-wheel 58—viz., by the bolts 59 passing through the hub of said fly-wheel and entering the hub of the gear-wheel—secures a distinct advantage in this construction of corn-husker and fodder-shredder. In the operation of the machine hard and unyielding substances are continually getting in between the several rollers.

In cases where a particularly hard and unyielding substance wedges between the rollers some of the parts must necessarily suffer damage, if not be broken. By the provision of the bolts 59 said bolts under such circumstances are the parts most likely to be affected by the strain and broken thereby. As soon as these bolts break no further damage is liable to be done to the machine. It is obvious that these bolts can be readily and quickly replaced.

The rear end of one of the inner shafts 22 is provided with a large gear-wheel 62, which is adapted to mesh with the gear-wheel 58, whereby rotation is imparted to said shaft 22. At their forward ends each of the several shafts 21 and 22 are provided with intermeshing gears 63. The rotation thus imparted to one of the shafts 22 will be communicated to all of the several shafts.

The main driving-shaft 55 carries thereon at a point immediately below the feed or stalk severing portions of the rollers inclined or oblique saws 64. These saws are each provided, peripherally, with a series of curved cutting-fingers 65. They are mounted in oblique positions upon the shaft by means of spacing-collars 66, the two outside collars being keyed to said shaft and having their inner faces beveled. These collars are provided with oblique central openings 67, and inasmuch as the shaft passes through these openings it is obvious that the collars are arranged on the shaft in inclined positions. These collars are provided with opposite side flanges or faces 68 68, and between the opposed faces of two adjacent collars the saws 64 are placed, being clamped between the opposed faces by means of bolts 69. The saws are arranged within a casing 71, provided with an inclined bottom.

One of the bearings for the main driving-shaft is formed by a semicircular recess 72 in the lower piece of the lower section 35 of the rear journal-boxes. The main shaft is adapted to be fitted therein and to be held thereto by a semicircular cap-piece. (Not shown.) The bearing for the opposite end of the drive-shaft is indicated by the numeral 70. This lower section 35 of the rear journal-box is also provided with the connecting oblique ribs 73 73, against which are adapted to rest the rear ends of longitudinal bars 74 74'. Bolts 75 75 pass through the oblique ribs 73 73 and through elongated slots 76 76 in the ends of the bars. The lower ends of the oblique ribs 73 are provided with inwardly-projecting lugs 77 77, through which set-screws 78 78 pass, the upper ends of said set-screws bearing against the under edges of the bars 74.

Between the longitudinal side pieces 20, at the forward end of the main driving-shaft 55, is secured a bracket 79, said bracket provided with oblique ribs 80 80, against which rest the forward ends of the longitudinal bars 74 74'. Bolts 81 81 pass through these oblique ribs and through elongated slots 82 82 in the forward ends of the longitudinal bars. The lower ends of these oblique ribs are also provided with inwardly-extending lugs 83 83, through which pass set-screws 84 84, the upper ends of said set-screws bearing against the under edges of the forward ends of the bars 74 74'.

It will be understood that the saws 64 rotate in the direction of the arrow, Fig. 4, and that the points of the curved cutting-fingers are successively brought into close proximity to the longitudinal bar 74. This bar therefore serves as a resistance medium against which the shredding-fingers of the saws act, the stalks which feed down between the two rollers nearest to the bar 74 being wedged against said bar, and are therefore successfully shredded by the action of the rotating saws, the fingers of said saws just clearing the lower edge of the bar. In order to adjust this bar closer to or farther away from the points of the fingers 65, the bolts 75 and 81 are loosened and the set-screws 78 and 84 for regulating the bar 74 are turned so as to either raise or lower said bar, as necessary. The stalks which pass between the rollers farthest removed from the bar 74 are carried by the curved fingers 65 over to and against said bar 74. While I have shown an extra bar 74', still this is not absolutely necessary to successful results. It is conveniently employed, however, inasmuch as it may sometimes be found desirable to reverse and to rotate the cutters in an opposite direction to that indicated by the arrow in Fig. 4. In this case, of course, the bar 74' can be used as the resistance medium against which the fingers 65 act.

Supported upon and secured to the truck is a fan-casing 85. A shaft 86 is journaled in suitable bearings 87 87, and the inner end of this shaft extends into the fan-casing and is provided with a series of wings 88, constituting the fan. The outer end of the shaft 86 is provided with a band-wheel 89, which is connected up to the belt-pulley 60 by means of a crossed belt 90. By this described connection rotation is imparted to the fan-shaft 86. The front side of the fan-casing is provided with an opening to which a trough 91 leads, the upper end of said trough extending upwardly and forwardly beneath the foward ends of the rollers 43 and 44. The casing 71 for the saws leads to and is adapted to deposit the cut stalks into this trough 91.

The perimeter of the fan-casing is provided with an opening 92, and to this opening connects a pipe 93, said pipe being advisably composed of a series of sections, whereby it may be lengthened or shortened, as desired, merely by adding to or taking away sections thereof. The shredded cornstalks are deposited into the trough 91, and the husks from the ears of corn, which after being stripped are forced between the rollers, also fall into this trough 91. Said shredded stalks and the husks then pass down into the fan-casing, and by means of the rapidly-rotating fan are forced by the blast of air up the pipe 93 to the place of deposit.

Above the rollers 43 43 is a hopper, formed by the opposite side pieces 94 94, these side pieces converging toward the rollers. Leading to the rear end of the hopper thus formed is a table 95. This table, at the forward end of its under side, is provided with sockets 96 96, which sockets receive the upper ends of supporting-legs 97 97'. The lower end of the leg 97 is supported in a socket 98, secured to the upper end of one of the uprights 19. The lower end of the longer supporting-leg 97' is supported in a socket 99, secured to the truck. The forward ends of the side pieces forming the hopper are held up to proper position by means of side braces similar to 100, which are attached at their lower ends to the longitudinal side pieces 20 20 and at their upper ends to said side pieces of the hopper. Another brace or support 101 extends up about centrally of the side piece 20 and the side piece 94, being secured to said respective side pieces. The upper end of this brace or support is connected to the table 95. Upon the opposite side a supporting brace or arm 102 is provided, said brace-arm being likewise connected to the side piece 20 and having its upper end bent over, with the inner side of the bend connected to the side piece of the table 95.

On the same side of the machine as the intermediate brace 101 is provided an upwardly and forwardly inclined brace 103, the upper and forward end of which being pivoted to the lower ends of arms 104 104 by means of a pivot-pin 105, which pin also passes through brace 101. Upon the opposite side of the machine is a similar upwardly and forwardly inclined brace 106. The forward end of this brace is adjacent to the outer face of the outer side of the bend of the supporting brace or arm 102. Short arms 107 107 straddle said arm 102 and the brace 106, the several parts being connected together by means of a pivot-pin 108. When the supporting-legs 97 97' are removed from their sockets, the table 95 is free to turn on the pins 105 and 108, so that its forward end rests upon the side pieces 94 of the hopper, while its rear end is somewhat elevated.

Across the rear end of the hopper extends a bracket 109, which prevents the corn from passing out of the rear end of the machine.

Just above the space 45 between the rollers 44 is a guard-strip 110, said strip having its upper edge advisably V-shaped in cross-section. This strip in practice will be of wood, and in order therefore to protect its upper edge from wear by the constant contact therewith of the feed said upper edge may be protected by means of a metallic V-shaped cap-piece 111.

Journaled in suitable bearings on the upper edges of the side pieces 94 of the trough is a transverse shaft 112. Upon this shaft are mounted two gates 113 113, the gates at the inner edges of their lower ends being beveled to fit accurately the upper V-shaped edge of the guard-strip 110. The lower ends of these gates lie on the upper portions of the rollers, as clearly indicated in Fig. 3, and compel the ears of corn in their travel down the rollers toward the front end of the machine to be brought to the rollers. Upon the side of the machine is a platform 114, on which the operator stands and feeds the corn to the table 95.

Projecting from the front of the truck is a plate 115, upon which turns a bracket 116, said bracket provided with upwardly-extending arms having yokes at their upper ends. The numeral 117 indicates a shaft which is adapted to turn freely through eyes formed in the arms of a supplemental bracket 118, said bracket 118 adapted to support the lower end of a conveyer-trough 119. The yoked upper ends of the arms of the bracket 116 fit around the eyes of the arms of bracket 118 and are held thereto by means of transverse pins 116'. Fixed on the shaft 117, between the arms of the supplemental bracket, is a sprocket-wheel 120. At the upper end of the conveyer-trough is mounted a short shaft 121, upon which is fixed a sprocket-wheel 122. The two sprocket-wheels 120 and 122 are connected by means of a sprocket-chain 123. The ends of the short shaft 121 are mounted in arms similar to 124 upon opposite sides of the conveyer-trough. The rear ends of these arms are provided with elongated slots 125, through which set-bolts 126 pass and enter the side pieces of the conveyer-trough. Secured to said side pieces of the conveyer-trough, to the rear of the rear ends of the arms 124, are brackets similar to 127. Through these brackets extend adjusting-screws 128, the ends of said screws engaging angular extensions from the arms 124. Whenever the sprocket-chains become slack and it is desired to regulate the tension thereof, all that is necessary to be done is to loosen the set-bolts 126 and then turn the adjusting-screws 128 in the desired direction. On one end of the shaft 117 is a yoke 129, and in the arms of said yoke is journaled a vertical pin 130. A short shaft 131 is journaled at the front of the frame of the machine, and this shaft carries thereon a toothed wheel 132, said wheel adapted to mesh with the gears on the forward end of either of the inner shafts 22 in order to receive motion therefrom. The toothed wheel 132 is formed with a yoke 133. This yoke is pivotally connected to the vertical pin 130, thereby forming a universal-joint connection between the shaft 117 and said shaft 131, whereby the rotation of shaft 131 is conveniently imparted to the shaft 117.

The bearing for the short shaft 131 consists of a bar 134, provided on its under side with a bearing-eye 135, which bearing-eye receives the end of the shaft 131. The bar on each side of the bearing-eye is provided with the elongated slots 136 136, through which slots bolts 137 137 pass, said bolts extending upwardly and engaging the lower edge of the lower section 23 of the front bearing-boxes. When the nuts on the ends of these bolts are loosened, the bar can be slid either to the right or the left, in order to bring the toothed wheel 132 into engagement with either of the gear-wheels upon the forward ends of the inner shafts 22.

The sprocket-chain is provided with sets of projecting fingers 138, each set consisting, preferably, of four of such fingers diverging from the chain and forming approximately a V, to conform to the shape of the conveyer-trough and permit the fingers to pass into said trough. These fingers are for the purpose of engaging the ears of corn as they pass into the trough and carrying the same up the trough to the discharge end thereof.

At the lower end of the conveyer-trough is provided a detachable angular guard 139, the side piece thereof being adjusted to the top edge of one of the side pieces of the trough, and the end piece of said angular guard covering the space across the upper portion of the lower end of the conveyer-trough. Secured to this end piece of the angular guard and extending down to cover the space between the lower edge of the end piece of the guard and the bottom of the trough is a gate 140, preferably of yielding or flexible material. The ears of corn, after leaving the rollers of the machine, pass into a short trough 141, and, as the conveyer-trough is usually adjusted at an angle to the discharge end of this short trough 141, the angular guard is so adjusted to the lower end of the conveyer-trough that the side piece of said angular guard will be on the side of the trough opposite to that side in which the ears of corn are fed. This upwardly-extending side piece, therefore, will prevent the ears of corn which naturally bank up at the feeding end of the conveyer-trough from passing over the side of said trough, while the end piece of the angular guard prevents the banked-up ears of corn from passing out of the lower end of the conveyer-trough. It is obvious, however, that this end piece of the angular guard must not completely cover the lower end of the conveyer-trough, as in such case it would be impossible for the carrying-fingers 138 to enter the conveyer-trough. It is for this reason that I provide an extension or gate 140 projecting from the lower edge of the end piece of the angular guard. This gate is provided with a series of slots which permit the carrying-fingers to pass, while at the same time the ears of corn in the conveyer-trough are prevented from passing out of the opening.

The conveyer-trough is held up at an inclined position by means of pivoted legs 142 142.

The yoke 129 of the shaft 117 is advisably not an integral part of the shaft, said yoke being provided with a hub which surrounds the end of the shaft. This hub is intersected by a slot 143, through which slot and through the shaft a pin 144 passes. The slot, it will be seen, is slightly elongated in the direction of the shaft in order to provide for lost motion.

While I have shown and described the several rollers 43 43 and 44 44 as mounted upon the shafts 21 21 and 22 22, yet it is obvious that said rollers may be cast with trunnions at opposite ends to subserve the same function as the shafts.

I also do not wish to be understood as limiting myself to specific details of construction herein shown and described, as obvious modifications thereof and variations therefrom may be made without departing from the spirit and scope of my invention.

The operator stands on the platform 114 and feeds the cornstalks onto the table 95. These stalks are discharged from the table 95 into the hopper below formed by the side pieces 94, and from said latter hopper the stalks fall onto the rear ends of the rollers. The teeth 47 then grasp the cornstalks and pull them between the rollers, in the widest portions of the spaces 46, where they are gradually worked down toward the more narrow portions of said rollers. The ears are broken off from the stalks by the action of the straight surfaces 48 as soon as the straight surfaces meet in the revolution of the rollers. The stalks are now acted upon by the saws in the manner previously pointed out, and the shredded stalks slide down the inclined bottom of the casing 71 into the trough 91, and from said trough pass into the fan-casing 85, where they are acted upon by the rotating fan, and thereby forced up the conduit 93 to the point of delivery. The ears of corn as severed from the stalks slide down the rollers and are spread out into two longitudinal lines by the guard 110 and prevented from passing between the rollers 44 by said guard. They are first acted upon by the fine creases 54, and if there are any short stubs of stalk remaining thereon these creases will have the effect of breaking the stubs off, said stubs then falling into the trough 91 below and passing to the fan-casing. The ears of corn next encounter the husking-teeth 49 and are stripped of their husks, said husks passing between the rollers and falling to the trough 91 below, and thence passing to the fan-casing, where they are driven upward in the conduit to the place of deposit. The ears of corn stripped of their husks pass off the forward end of the rollers into the short trough 141 and are then deposited into the conveyer-trough 119.

Inasmuch as the ears of corn do not always arrange themselves lengthwise on the husking-rollers, oftentimes working around to such a position that their points are caught between the rollers, it is necessary to a thoroughly successful machine that some provision should be made for splitting the points, and thereby permitting such ears to arrange themselves lengthwise on the rollers. I have therefore provided the outer rollers 44 with the transversely-elongated recesses 50, said recesses provided with the upwardly-extending rough portions 52. These upwardly-extending portions tear the points of the ears after said points have been split by the ribs 51, which points then pass between the rollers and fall into the trough 91. As the ears of corn are deposited into the conveyer-trough they are acted upon by the fingers 158 of the conveyer-chain, and thereby carried to the upper end of said trough for discharge at the desired place.

I arrange the saws 64 at an oblique angle in order to secure the most effective possible shredding. By this disposition of the saws almost a continuous or uninterrupted shredding edge is produced, thereby shredding the stalks up into fine slivers.

If it is desired to change the position of the conveyer-trough so as to bring its upper end in position to discharge at an angle to the position shown in Fig. 1, the pin 144 is first removed, and then the pins 116'. The conveyer-trough, shaft 117, and bracket 118 are now free to be removed together. The trough is then twisted around so that the end of the shaft 117 in Fig. 2 which was not connected to the yoke 129 may be connected to said yoke. The several pins are finally readjusted to place, and the conveyer-trough thus secured in its adjusted position. The set-screws 137 are next loosened and the bar 134 adjusted longitudinally, so as to bring the gear-wheel 132 into mesh with the gear of one of the inner shafts 22 next to the gear which is shown in meshing position in Fig. 3, the shaft 117 being finally coupled to the yoke 129 by means of the pin 144. The conveyer-chain will now run upwardly in the conveyer-trough, so as to carry the ears of corn upwardly in said trough, notwithstanding the shifting of the parts as above described, owing to the fact that the gear 132 has been thrown into mesh with a gear rotating in an opposite direction to the gear with which it was first in mesh. When the position of the conveyer-trough is thus changed, the angular guard 139 should be removed and a left-hand guard, similar in construction, adjusted in place thereof.

What I claim as my invention is—

1. In a combined feed-cutter and corn-husker, the combination, with a frame, of rotatable rollers journaled therein, said rollers provided with a line of transversely-elongated recesses, forming a series of ribs therebetween, said recesses having a raised portion projecting therefrom.

2. In a combined feed-cutter and corn-husker, the combination, with a frame, of a series of rotatable rollers journaled therein, said several rollers provided at their feed ends around a portion of the periphery thereof with radially-projecting teeth, the rows of teeth of each adjacent roller alternating with each other, and the portions of the feed ends not provided with the teeth forming plain or smooth surfaces, and said feed ends of the several rollers having spaces between the adjacent rollers, which spaces gradually narrow inwardly, and the portions of the inner rollers in advance of the feed ends provided with a series of husking-pins, and having a space therebetween sufficient to allow the pins of one inner roller to clear the other inner roller, and the portions of the outer rollers of the series in advance of the feeding ends thereof contacting with the inner rollers, and provided with recesses to receive the husking-pins of said inner rollers, as the series of rollers revolve, and also provided longitudinally along one portion with transversely-elongated recesses, and at diametrically opposite points of said transversely-elongated recesses, and near their feed ends, with a series of fine creases.

3. In a combined feed-cutter and corn-husker, the combination, of a frame, a bracket pivotally secured to the front of the frame, a shaft journaled in said bracket, and having a sprocket-wheel mounted thereon, and formed or provided at one end with a yoke, a conveyer-trough secured at its inner end to the bracket, and adapted to receive material from the frame of the machine, a shaft mounted in bearings at the outer end of the trough, said shaft having a sprocket-wheel mounted thereon, a sprocket-chain connecting the two sprocket-wheels, said chain passing into the conveyer-trough, and adapted to carry the material upwardly therein, a bearing adjustably secured to the frame, a shaft mounted therein, said shaft carrying a gear-wheel, and provided at one end with a yoke pivotally connected to the yoke of the other shaft, and oppositely-rotating gear-wheels, with either one of which the gear of the shaft which is mounted in the adjustable bearing, is adapted to mesh.

4. In a combined feed-cutter and corn-husker, the combination, of a frame, a bracket pivotally secured to the front of the frame, a shaft supported by the arms of said bracket and having a sprocket-wheel mounted thereon, a yoke adapted to be removably secured to either end of this shaft, a supplemental bracket provided with bearings for the shaft, a conveyer-trough secured at its inner end to the bracket, and adapted to receive the material from the frame, a shaft mounted in bearings at the outer end of the trough, said shaft having a sprocket-wheel mounted thereon, a sprocket-chain connecting the two sprocket-wheels, said chain passing into the conveyer-trough, and adapted to convey the material upwardly therein, a bearing adjustably secured to the frame, a shaft mounted in the adjustable bearing, said shaft carrying a gear-wheel, and provided at one end with a yoke adapted to be pivotally connected to the yoke on either end of the other shaft, and oppositely-rotating gears, with either one of which the gear of the shaft which is mounted in the adjustable bearing, is adapted to mesh.

In testimony whereof I affix my signature in presence of two witnesses.

AUGUST ROSENTHAL.

Witnesses:
ARTHUR L. MORSELL,
ANNA V. FAUST.